(12) United States Patent
Polly et al.

(10) Patent No.: US 11,154,799 B2
(45) Date of Patent: Oct. 26, 2021

(54) DUAL BYPASS FILTER CASCADE

(71) Applicant: UNITED TECHNOLOGIES CORPORATION, Farmington, CT (US)

(72) Inventors: Joseph H. Polly, Tolland, CT (US); Nicholas D. Leque, Vernon, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 124 days.

(21) Appl. No.: 16/555,813

(22) Filed: Aug. 29, 2019

(65) Prior Publication Data

US 2021/0060461 A1 Mar. 4, 2021

(51) Int. Cl.
| | |
|---|---|
| *B01D 35/147* | (2006.01) |
| *B01D 29/33* | (2006.01) |
| *B01D 35/02* | (2006.01) |
| *B01D 29/58* | (2006.01) |
| *F01D 25/18* | (2006.01) |

(52) U.S. Cl.
CPC .......... *B01D 35/147* (2013.01); *B01D 29/33* (2013.01); *B01D 29/58* (2013.01); *B01D 35/02* (2013.01); *F01D 25/18* (2013.01)

(58) Field of Classification Search
CPC ...... B01D 35/147; B01D 35/02; B01D 29/58; B01D 29/33; F01D 25/18
See application file for complete search history.

(56) References Cited

U.S. PATENT DOCUMENTS

| | | | |
|---|---|---|---|
| 3,390,774 | A | 7/1968 | Neely |
| 3,397,786 | A | 8/1968 | Hultgren |
| 4,512,299 | A | 4/1985 | Egan et al. |
| 4,905,644 | A | 3/1990 | Masclet |
| 7,479,219 | B2 | 1/2009 | Rassinger |
| 2011/0147322 | A1 | 6/2011 | Payne et al. |
| 2018/0230854 | A1 | 8/2018 | Parnin |
| 2018/0345172 | A1* | 12/2018 | Leque ..................... F01D 25/18 |

FOREIGN PATENT DOCUMENTS

| | | |
|---|---|---|
| EP | 3412878 | 12/2018 |
| JP | S6278420 | 4/1987 |

OTHER PUBLICATIONS

European Patent Office, European Search Report dated Nov. 16, 2020 in Application No. 20191221.9.

* cited by examiner

*Primary Examiner* — Waqaas Ali
(74) *Attorney, Agent, or Firm* — Snell & Wilmer L.L.P.

(57) ABSTRACT

A filtration system is disclosed. In various embodiments, the filtration system includes a fine mesh filter configured for disposition within a chamber and defining a first volume, the first volume in fluid communication with a main exit conduit; and a coarse mesh filter configured for disposition within the chamber and at least partially surrounding the fine mesh filter, the coarse mesh filter and the fine mesh filter defining a second volume, the second volume in fluid communication with a first bypass valve, the coarse mesh filter and the chamber defining a third volume, the third volume in fluid communication with a second bypass valve.

20 Claims, 5 Drawing Sheets

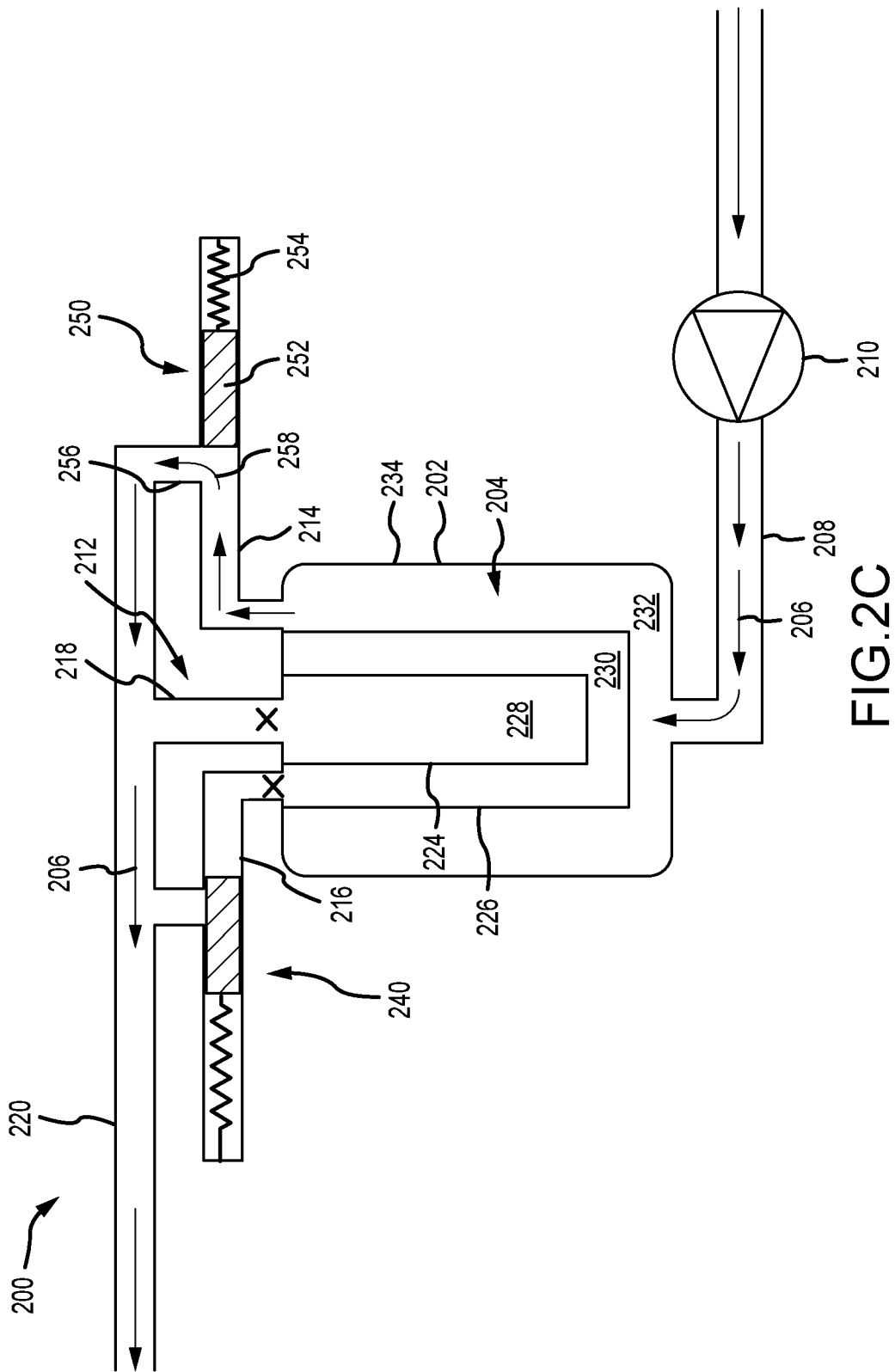

DUAL BYPASS FILTER CASCADE

FIELD

The present disclosure relates generally to gas turbine engines and, more particularly, to oil or lubricant filtration systems used in gas turbine engines.

BACKGROUND

Gas turbine engines typically include a fan section, a compressor section, a combustor section and a turbine section. The fan section drives air along a bypass flow path while the compressor section drives air along a core flow path. In general, during operation, air is pressurized in the compressor section and is mixed with fuel and burned in the combustor section to generate hot combustion gases. Subsequent to combustion, the hot combustion gases flow through the turbine section, which extracts energy from the hot combustion gases to power the compressor section and other gas turbine engine loads, such as those required to rotate a fan in the fan section. The compressor section typically includes low pressure and high pressure compressors, and the turbine section includes low pressure and high pressure turbines.

The rotating components of a gas turbine engine, such as, for example, the low pressure and high pressure compressors, the low pressure and high pressure turbines and the fan, rely on various bearing systems or gear systems located throughout the engine. The bearing systems or gear systems typically exhibit close tolerances among the working parts or contact surfaces in order to facilitate high rotational velocities of the rotating components. In order for these systems to function properly and reliably, a supply of oil or lubricant that is generally debris-free is delivered to the working parts or contact surfaces of the various components comprising the bearing or gear systems. In order to maintain the oil or lubricant in a generally debris-free condition, filtration systems are typically incorporated into one or more lubrication systems configured to deliver the oil or lubricant to the gear or bearing systems.

SUMMARY

A filtration system is disclosed. In various embodiments, the filtration system includes a fine mesh filter configured for disposition within a chamber and defining a first volume, the first volume in fluid communication with a main exit conduit; and a coarse mesh filter configured for disposition within the chamber and at least partially surrounding the fine mesh filter, the coarse mesh filter and the fine mesh filter defining a second volume, the second volume in fluid communication with a first bypass valve, the coarse mesh filter and the chamber defining a third volume, the third volume in fluid communication with a second bypass valve.

In various embodiments, the fine mesh filter defines a characteristic fine mesh size and the coarse mesh filter defines a characteristic coarse mesh size greater than the characteristic fine mesh size. In various embodiments, the characteristic coarse mesh size is about thirty micrometers to about forty micrometers. In various embodiments, the characteristic fine mesh size is about three micrometers to about six micrometers.

In various embodiments, the first bypass valve is configured to fluidly couple a fine filter bypass conduit to the second volume. In various embodiments, the second bypass valve is configured to fluidly couple a coarse filter bypass conduit to the third volume. In various embodiments, the fine filter bypass conduit is fluidly coupled to the main exit conduit and to an outlet conduit. In various embodiments, the coarse filter bypass conduit is fluidly coupled to the main exit conduit and to the outlet conduit.

In various embodiments, the first bypass valve includes a first bias mechanism responsive to a fine filter bypass threshold pressure. In various embodiments, the second bypass valve includes a second bias mechanism responsive to a coarse filter bypass threshold pressure. In various embodiments, the coarse filter bypass threshold pressure is greater than the fine filter bypass threshold pressure.

A filtration system for a gas turbine engine is disclosed. In various embodiments, the filtration system includes a chamber; a fine mesh filter configured for disposition within the chamber and defining a first volume, the first volume in fluid communication with a main exit conduit; and a coarse mesh filter configured for disposition within the chamber and at least partially surrounding the fine mesh filter, the coarse mesh filter and the fine mesh filter defining a second volume, the second volume in fluid communication with a first bypass valve, the coarse mesh filter and the chamber defining a third volume, the third volume in fluid communication with a second bypass valve.

In various embodiments, the main exit conduit is fluidly coupled to an outlet conduit, the outlet conduit configured to provide a lubricant to a component within the gas turbine engine. In various embodiments, the component is a bearing system or a gear system. In various embodiments, the first bypass valve is configured to fluidly couple a fine filter bypass conduit to the second volume and the second bypass valve is configured to fluidly couple a coarse filter bypass conduit to the third volume. In various embodiments, the fine filter bypass conduit is fluidly coupled to the main exit conduit and to the outlet conduit and the coarse filter bypass conduit is fluidly coupled to the main exit conduit and to the outlet conduit. In various embodiments, the first bypass valve includes a first bias mechanism responsive to a fine filter bypass threshold pressure, the second bypass valve includes a second bias mechanism responsive to a coarse filter bypass threshold pressure and the coarse filter bypass threshold pressure is greater than the fine filter bypass threshold pressure.

A method of filtering a flow of lubricant is disclosed. In various embodiments, the method includes delivering the flow of lubricant to a chamber containing a fine mesh filter and a coarse mesh filter surrounding the fine mesh filter, the fine mesh filter defining a first volume in fluid communication with a main exit conduit; passing the flow of lubricant through the coarse mesh filter via a coarse mesh flow; passing the flow of lubricant through the fine mesh filter via a fine mesh flow; bypassing the flow of lubricant from passing through the fine mesh filter upon a fine filter pressure within a second volume defined by the coarse mesh filter and the fine mesh filter reaching a fine filter bypass threshold pressure; and bypassing the flow of lubricant from passing through the coarse mesh filter upon a coarse filter pressure within a third volume defined by the chamber and the coarse mesh filter reaching a coarse filter bypass threshold pressure.

In various embodiments, bypassing the flow of lubricant from passing through the fine mesh filter includes opening a first bypass valve and directing the flow of lubricant through a fine filter bypass conduit and into an outlet conduit. In various embodiments, bypassing the flow of lubricant from passing through the coarse mesh filter includes opening a second bypass valve and directing the flow of lubricant through a coarse filter bypass conduit and into the outlet conduit.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

FIG. 2C is a schematic view of a filtration system in a coarse filter bypass mode of operation, in accordance with various embodiments.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined. Further, the term "about" is intended to include a degree of error associated with measurement of a particular quantity based upon equipment or techniques otherwise available at the time of filing the application. For example, "about" may include a range of ±8% or 5% or 2% of a given value.

Figure 1:
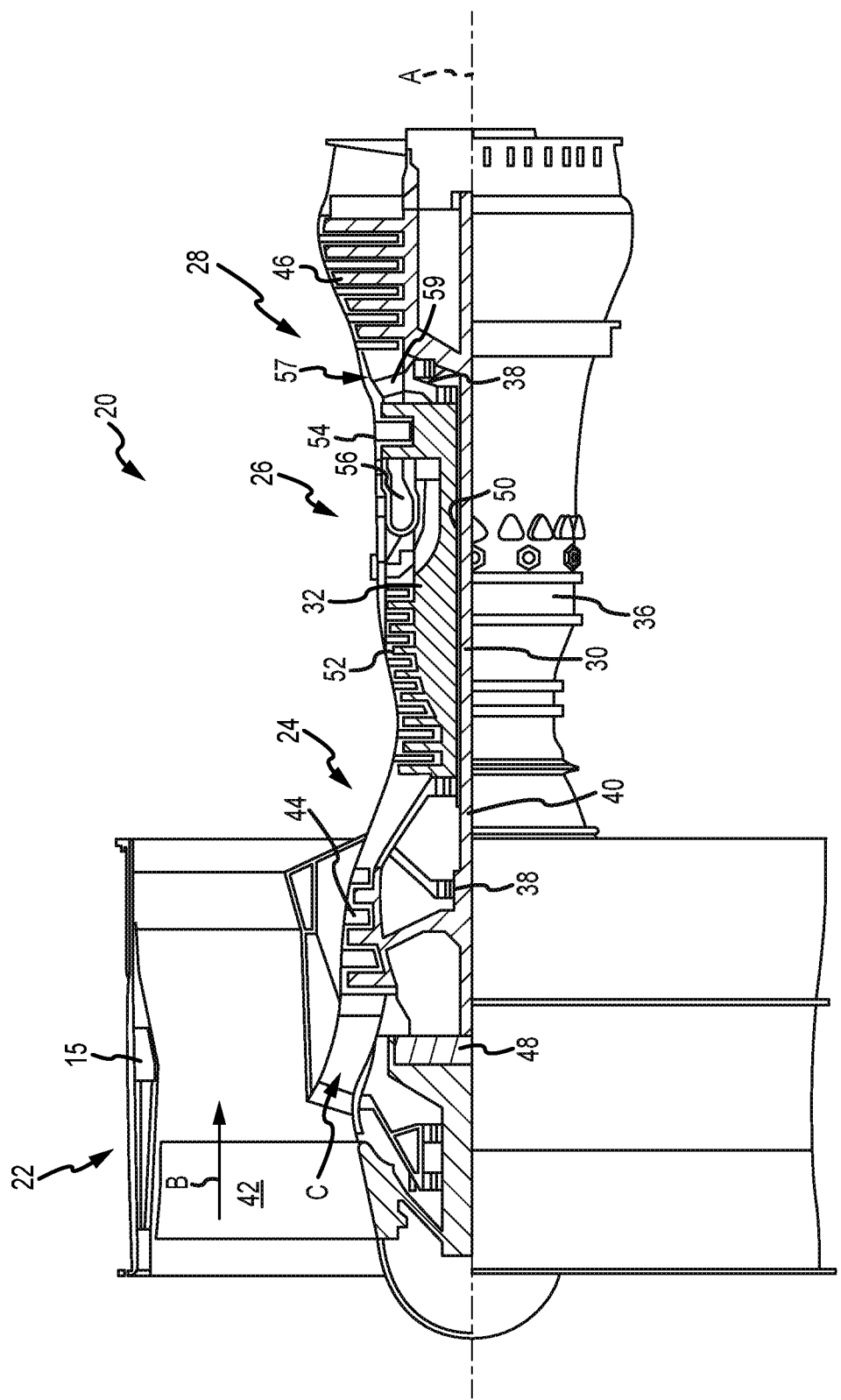
FIG. 1 is a cross sectional schematic view of a gas turbine engine, in accordance with various embodiments.

Referring now to the drawings, FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, while the compressor section 24 drives air along a core flow path C for compression and communication into the combustor section 26 and then expansion through the turbine section 28. Although depicted as a two-spool turbofan gas turbine engine in the disclosed non-limiting embodiment, the concepts described herein are not limited to use with two-spool turbofans as the teachings may be applied to other types of turbine engines.

The gas turbine engine 20 generally includes a low speed spool 30 and a high speed spool 32 mounted for rotation about an engine central longitudinal axis A relative to an engine static structure 36 via several bearing systems 38. Various bearing systems at various locations may alternatively or additionally be provided and the location of the several bearing systems 38 may be varied as appropriate to the application. The low speed spool 30 generally includes an inner shaft 40 that interconnects a fan 42, a low pressure compressor 44 and a low pressure turbine 46. The inner shaft 40 is connected to the fan 42 through a speed change mechanism, which in this gas turbine engine 20 is illustrated as a fan drive gear system 48 configured to drive the fan 42 at a lower speed than that of the low speed spool 30. The high speed spool 32 includes an outer shaft 50 that interconnects a high pressure compressor 52 and a high pressure turbine 54. A combustor 56 is arranged in the gas turbine engine 20 between the high pressure compressor 52 and the high pressure turbine 54. A mid-turbine frame 57 of the engine static structure 36 is arranged generally between the high pressure turbine 54 and the low pressure turbine 46 and may include airfoils 59 in the core flow path C for guiding the flow into the low pressure turbine 46. The mid-turbine frame 57 further supports the several bearing systems 38 in the turbine section 28. The inner shaft 40 and the outer shaft 50 are concentric and rotate via the several bearing systems 38 about the engine central longitudinal axis A, which is collinear with longitudinal axes of the inner shaft 40 and the outer shaft 50.

The air in the core flow path C is compressed by the low pressure compressor 44 and then the high pressure compressor 52, mixed and burned with fuel in the combustor 56, and then expanded over the high pressure turbine 54 and the low pressure turbine 46. The low pressure turbine 46 and the high pressure turbine 54 rotationally drive the respective low speed spool 30 and the high speed spool 32 in response to the expansion. It will be appreciated that each of the positions of the fan section 22, the compressor section 24, the combustor section 26, the turbine section 28, and the fan drive gear system 48 may be varied. For example, the fan drive gear system 48 may be located aft of the combustor section 26 or even aft of the turbine section 28, and the fan section 22 may be positioned forward or aft of the location of the fan drive gear system 48.

Figure 2A:
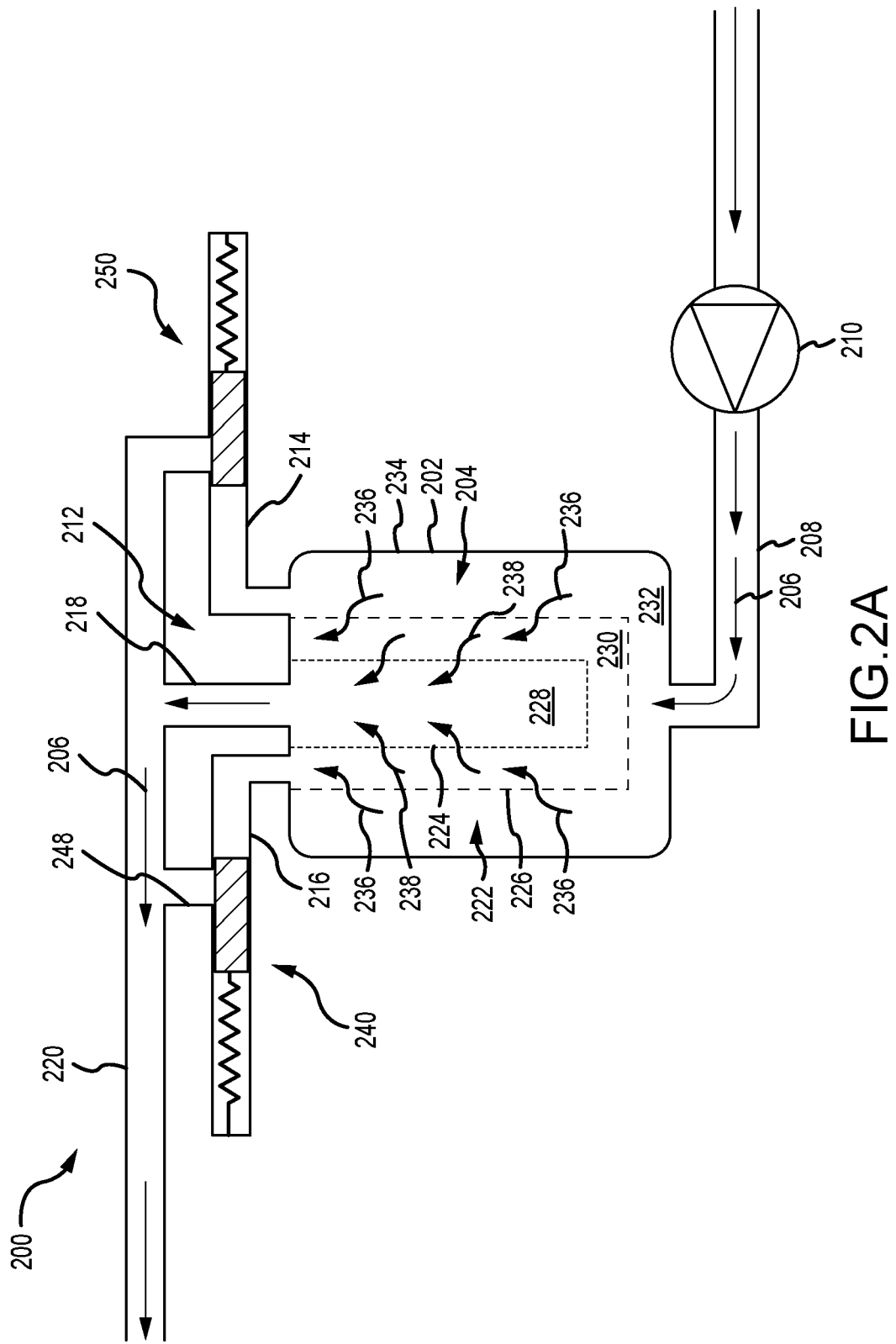
FIG. 2A is a schematic view of a filtration system in a normal mode of operation, in accordance with various embodiments.
Figure 2B:
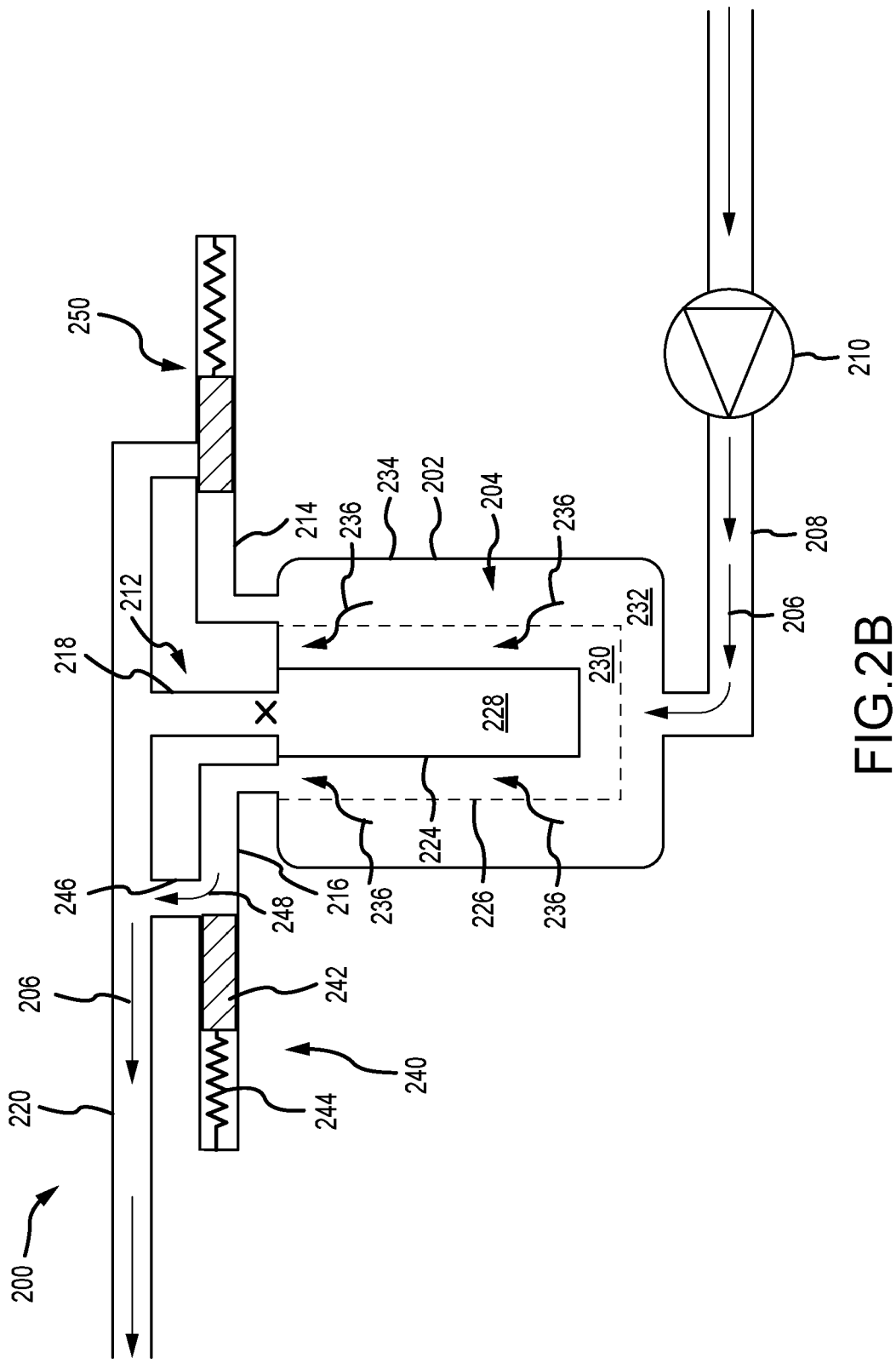
FIG. 2B is a schematic view of a filtration system in a fine filter bypass mode of operation, in accordance with various embodiments.

Referring now to FIGS. 2A, 2B and 2C, a filtration system 200 is illustrated with respect to various modes of operation. The filtration system 200 is part of a lubrication system that routes oil or lubricant from a source to one or more bearing or gear assemblies used within a gas turbine engine, such as, for example, one or more of the several bearing systems 38 or the fan drive gear system 48 used within the gas turbine engine 20 described above with reference to FIG. 1. In various embodiments, the filtration system 200 may be used to filter a flow of lubricant being routed to numerous bearing or gear systems located in numerous places of a gas turbine engine, such as, for example, bearing or gear systems located in the fan section 22, the compressor section 24, the combustor section 26 and the fan drive gear system 48 described above with reference to FIG. 1.

In various embodiments, the filtration system 200 includes a chamber 202 that defines an interior region 204. The interior region 204 is configured to contain oil or lubricant for supply to a bearing or gear system, such as those described above. In particular, a flow of lubricant 206 is provided to the interior region 204 via an inlet conduit 208 that is supplied by a pump 210. As described herein, the flow of lubricant 206 supplied to the chamber 202 is filtered therein and subsequently expelled from the chamber 202 via one or more of a plurality of exit conduits 212 which, in various embodiments, may include a coarse filter bypass conduit 214, a fine filter bypass conduit 216 and a main exit conduit 218. In various embodiments, each of the coarse filter bypass conduit 214, the fine filter bypass conduit 216 and the main exit conduit 218 are routed to an outlet conduit 220, which is used to route the lubricant to one or more of the bearing or gear systems described above.

In various embodiments, filtration of the flow of lubricant 206 is accomplished using a dual-filter system 222, although additional numbers of filters may be used in accordance with the principles described herein. For example, as illustrated, the dual-filter system 222 may comprise a fine mesh filter 224 (or a first filter, indicated by dashed lines) and a coarse mesh filter 226 (or a second filter, indicated by dashed lines). In various embodiments, the fine mesh filter 224 defines a first volume 228 (or a first cylindrical volume or fine mesh volume) disposed inside a second volume 230 (or a second cylindrical volume or second mesh volume). Likewise, the chamber 202 or the interior region 204 may define a third volume (or a third cylindrical volume or chamber volume). Although the volumes defined herein are generally referred to as cylindrical, the disclosure contemplates other volumes, such as, for example, volumes having triangular, square, or N-pentagonal cross sections. In various embodiments, the first volume 228 includes the volume within the region defined by the fine mesh filter 224, the second volume 230 includes the volume within the region bounded by the coarse mesh filter 226 and the fine mesh filter 224, and the third volume 232 includes the volume within the region bounded by the chamber 202 (or a chamber wall 234) and the coarse mesh filter 226.

Referring now primarily to FIG. 2A, operation of the filtration system in a normal operational mode is illustrated. As described above, the flow of lubricant 206 is initially provided to the chamber 202. Once in the chamber 202, or in the third volume 232, the filtration system 200 is configured such that, in the normal operational mode, the flow of lubricant 206 first passes through the coarse mesh filter 226 via a coarse mesh flow 236, which flows from the third volume 232 to the second volume 230, and then through the fine mesh filter 224 via a fine mesh flow 238, which flows from the second volume 230 to the first volume 228. As the flow of lubricant 206 passes through the coarse mesh filter 226 via the coarse mesh flow 236, particulate matter (e.g., coarse size debris) having a characteristic particulate size greater than a characteristic coarse mesh size (e.g., thirty micrometers to forty micrometers, or 30-40 µm) is filtered from the flow of lubricant 206. Similarly, as the flow of lubricant 206 passes through the fine mesh filter 224 via the fine mesh flow 238, particulate matter (e.g., fine size debris) having a characteristic particulate size greater than a characteristic fine mesh size (e.g., three micrometers to six micrometers, or 3-6 µm) is filtered from the flow of lubricant 206. Once through the fine mesh filter 224, the flow of lubricant 206 passes through the main exit conduit 218 and is routed to the outlet conduit 220, which is used to route the flow of lubricant 206 to one or more of the bearing or gear systems described above.

Referring now primarily to FIG. 2B, operation of the filtration system in a fine filter bypass mode of operation is illustrated. As described above, the flow of lubricant 206 is initially provided to the chamber 202. Once in the chamber 202, or in the third volume 232, the filtration system 200 is configured such that, in the fine filter bypass mode of operation, the flow of lubricant 206 first passes through the coarse mesh filter 226 via a coarse mesh flow 236, which flows from the third volume 232 to the second volume 230. Unlike the normal mode of operation described above with reference to FIG. 2A, in the fine filter bypass mode of operation, the fine mesh filter 224 has become blocked, clogged or otherwise impenetrable (indicated by the solid line), thereby halting the fine mesh flow 238 (see FIG. 2A), which would otherwise flow from the second volume 230 to the first volume 228. In various embodiments, the blocking of the fine mesh filter 224 may occur through the filter becoming clogged with particulate matter (e.g., fine size debris) having a characteristic particulate size greater than a characteristic fine mesh size (e.g., 3-6 µm). This may occur over time where the fine size debris builds a layer of debris within or about the fine mesh filter 224 that thereby blocks the fine mesh flow 238 from passing through the fine mesh filter 224. In various embodiments, the blocking of the fine mesh filter 224 may also occur through the filter becoming impenetrable due to the viscous nature of the lubricant. For example, in certain environments, a cold start of an engine may be undertaken at temperatures on the order of minus forty degrees Fahrenheit (−40° F. or −40° C.) or colder. At such low temperatures, the viscosity of the lubricant may be sufficiently high as to render the lubricant unable to pass through the fine mesh filter 224. Regardless of the mode of blocking, as the lubricant is blocked from passing through the fine mesh filter 224, the pressure within the second volume 230 (or a fine filter pressure) increases. The increase in pressure within the second volume 230 acts upon a first bypass valve 240 (or a second volume (230) bypass valve). As a fine filter bypass threshold pressure is reached, the first bypass valve 240, which, in various embodiments, may comprise a first plunger 242 (e.g., a first sphere or a first rod) and a first bias mechanism 244 (e.g., a first coil spring), functions to open a first flow orifice 246, thereby establishing a first bypass flow 248. The first bypass flow 248, during the fine filter bypass mode of operation, routes the flow of lubricant 206, that would otherwise flow through the main exit conduit 218, through the fine filter bypass conduit 216. Once the flow of lubricant 206 is routed through the fine filter bypass conduit 216, the flow is routed to the outlet conduit 220, which is used to route the flow of lubricant 206 to one or more of the bearing or gear systems described above.

Referring now primarily to FIG. 2C, operation of the filtration system in a coarse filter bypass mode of operation is illustrated. As described above, the flow of lubricant 206 is initially provided to the chamber 202. Unlike the normal mode of operation described above with reference to FIG. 2A or the fine filter bypass mode of operation described above with reference to FIG. 2B, in the coarse filter bypass mode of operation, the coarse mesh filter 226 has become blocked, clogged or otherwise impenetrable (indicated by the solid line), thereby halting the coarse mesh flow 236 (see FIG. 2B), which would otherwise flow from the third volume 232 to the second volume 230. In various embodiments, the blocking of the coarse mesh filter 226 may occur through the filter becoming clogged with particulate matter (e.g., coarse size debris) having a characteristic particulate size greater than a characteristic coarse mesh size (e.g., 30-40 μm). This may occur over time where the coarse size debris builds a layer of debris within or about the coarse mesh filter 226 that thereby blocks the coarse mesh flow 236 from passing through the coarse mesh filter 226. In various embodiments, the blocking of the coarse mesh filter 226 may also occur through the filter becoming impenetrable due to the viscous nature of the lubricant. For example, in certain environments, a cold start of an engine may be undertaken at temperatures on the order of minus forty degrees Fahrenheit (−40° F. or −40° C.) or colder. At such low temperatures, the viscosity of the lubricant may be sufficiently high so as to render the lubricant unable to pass through the coarse mesh filter 226. Regardless of the mode of blocking, as the lubricant is blocked from passing through the coarse mesh filter 226, the pressure within the third volume 232 (or a coarse filter pressure) increases. The increase in pressure within the third volume 232 acts upon a second bypass valve 250 (or a third volume (232) bypass valve). As a coarse filter bypass threshold pressure is reached, the second bypass valve 250, which, in various embodiments, may comprise a second plunger 252 (e.g., a second sphere or a second rod) and a second bias mechanism 254 (e.g., a second coil spring), functions to open a second flow orifice 256, thereby establishing a second bypass flow 258. The second bypass flow 258, during the coarse filter bypass mode of operation, routes the flow of lubricant 206, that would otherwise flow through the main exit conduit 218 or through the fine filter bypass conduit 216, through the coarse filter bypass conduit 214. Once the flow of lubricant 206 is routed through the coarse filter bypass conduit 214, the flow is routed to the outlet conduit 220, which is used to route the flow of lubricant 206 to one or more of the bearing system or gear system described above.

Figure 3:
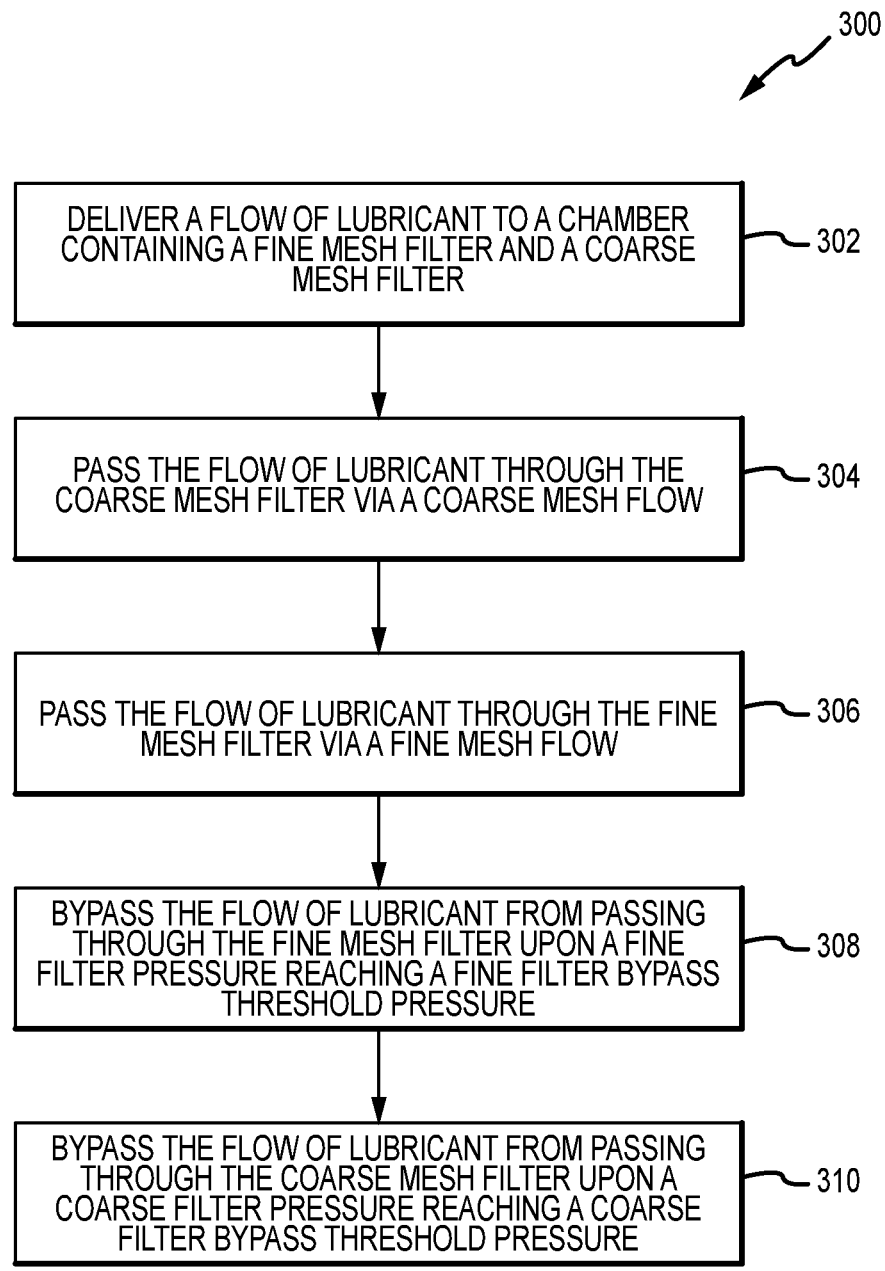
FIG. 3 is a flowchart illustrating a method of filtering a flow of lubricant, in accordance with various embodiments.

Referring now to FIG. 3, a method (300) of filtering a flow of lubricant is described, in accordance with various embodiments. A first step 302 includes delivering the flow of lubricant to a chamber containing a fine mesh filter and a coarse mesh filter surrounding the fine mesh filter, the fine mesh filter defining a first volume in fluid communication with a main exit conduit. A second step 304 includes passing the flow of lubricant through the coarse mesh filter via a coarse mesh flow. A third step 306 includes passing the flow of lubricant through the fine mesh filter via a fine mesh flow. A fourth step 308 includes bypassing the flow of lubricant from passing through the fine mesh filter upon a fine filter pressure within a second volume defined by the coarse mesh filter and the fine mesh filter reaching a fine filter bypass threshold pressure. A fifth step 310 includes bypassing the flow of lubricant from passing through the coarse mesh filter upon a coarse filter pressure within a third volume defined by the chamber and the coarse mesh filter reaching a coarse filter bypass threshold pressure. In various embodiments, bypassing the flow of lubricant from passing through the fine mesh filter includes opening a first bypass valve and directing the flow of lubricant through a fine filter bypass conduit and into an outlet conduit. In various embodiments, bypassing the flow of lubricant from passing through the coarse mesh filter includes opening a second bypass valve and directing the flow of lubricant through a coarse filter bypass conduit and into the outlet conduit.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed:

1. A filtration system, comprising:
   a fine mesh filter configured for disposition within a chamber and defining a first volume, the first volume in fluid communication with a main exit conduit; and
   a coarse mesh filter configured for disposition within the chamber and at least partially surrounding the fine mesh filter, the coarse mesh filter and the fine mesh filter defining a second volume, the second volume in fluid communication with a first bypass valve, the coarse mesh filter and the chamber defining a third volume, the third volume in fluid communication with a second bypass valve.

2. The filtration system of claim 1, wherein the fine mesh filter defines a characteristic fine mesh size and the coarse mesh filter defines a characteristic coarse mesh size greater than the characteristic fine mesh size.

3. The filtration system of claim 2, wherein the characteristic coarse mesh size is thirty micrometers to about forty micrometers.

4. The filtration system of claim 3, wherein the characteristic fine mesh size is three micrometers to about six micrometers.

5. The filtration system of claim 1, wherein the first bypass valve is configured to fluidly couple a fine filter bypass conduit to the second volume.

6. The filtration system of claim 5, wherein the second bypass valve is configured to fluidly couple a coarse filter bypass conduit to the third volume.

7. The filtration system of claim 6, wherein the fine filter bypass conduit is fluidly coupled to the main exit conduit and to an outlet conduit.

8. The filtration system of claim 7, wherein the coarse filter bypass conduit is fluidly coupled to the main exit conduit and to the outlet conduit.

9. The filtration system of claim 1, wherein the first bypass valve includes a first bias mechanism responsive to a fine filter bypass threshold pressure.

10. The filtration system of claim 9, wherein the second bypass valve includes a second bias mechanism responsive to a coarse filter bypass threshold pressure.

11. The filtration system of claim 10, wherein the coarse filter bypass threshold pressure is greater than the fine filter bypass threshold pressure.

12. A filtration system for a gas turbine engine, comprising:
    a chamber;
    a fine mesh filter configured for disposition within the chamber and defining a first volume, the first volume in fluid communication with a main exit conduit; and
    a coarse mesh filter configured for disposition within the chamber and at least partially surrounding the fine mesh filter, the coarse mesh filter and the fine mesh filter defining a second volume, the second volume in fluid communication with a first bypass valve, the coarse mesh filter and the chamber defining a third volume, the third volume in fluid communication with a second bypass valve.

13. The filtration system of claim 12, wherein the main exit conduit is fluidly coupled to an outlet conduit, the outlet conduit configured to provide a lubricant to a component within the gas turbine engine.

14. The filtration system of claim 13, wherein the component is a bearing system or a gear system.

15. The filtration system of claim 14, wherein the first bypass valve is configured to fluidly couple a fine filter bypass conduit to the second volume and the second bypass valve is configured to fluidly couple a coarse filter bypass conduit to the third volume.

16. The filtration system of claim 15, wherein the fine filter bypass conduit is fluidly coupled to the main exit conduit and to the outlet conduit and the coarse filter bypass conduit is fluidly coupled to the main exit conduit and to the outlet conduit.

17. The filtration system of claim 16, wherein the first bypass valve includes a first bias mechanism responsive to a fine filter bypass threshold pressure, the second bypass valve includes a second bias mechanism responsive to a coarse filter bypass threshold pressure and the coarse filter bypass threshold pressure is greater than the fine filter bypass threshold pressure.

18. A method of filtering a flow of lubricant, comprising:
    delivering the flow of lubricant to a chamber containing a fine mesh filter and a coarse mesh filter surrounding the fine mesh filter, the fine mesh filter defining a first volume in fluid communication with a main exit conduit;
    passing the flow of lubricant through the coarse mesh filter via a coarse mesh flow;
    passing the flow of lubricant through the fine mesh filter via a fine mesh flow;
    bypassing the flow of lubricant from passing through the fine mesh filter upon a fine filter pressure within a second volume defined by the coarse mesh filter and the fine mesh filter reaching a fine filter bypass threshold pressure; and
    bypassing the flow of lubricant from passing through the coarse mesh filter upon a coarse filter pressure within a third volume defined by the chamber and the coarse mesh filter reaching a coarse filter bypass threshold pressure.

19. The method of claim 18, wherein bypassing the flow of lubricant from passing through the fine mesh filter includes opening a first bypass valve and directing the flow of lubricant through a fine filter bypass conduit and into an outlet conduit.

20. The method of claim 19, wherein bypassing the flow of lubricant from passing through the coarse mesh filter includes opening a second bypass valve and directing the flow of lubricant through a coarse filter bypass conduit and into the outlet conduit.

* * * * *